(12) United States Patent
Crago

(10) Patent No.: US 6,550,654 B1
(45) Date of Patent: Apr. 22, 2003

(54) CARGO NET ASSEMBLY

(75) Inventor: Garth Crago, Plymouth, MI (US)

(73) Assignee: Magna Interior Systems Inc., Aurora (CA)

(*) Notice: Subject to any disclaimer, the term of this patent is extended or adjusted under 35 U.S.C. 154(b) by 0 days.

(21) Appl. No.: 09/763,386
(22) PCT Filed: Aug. 20, 1999
(86) PCT No.: PCT/CA99/00773
§ 371 (c)(1), (2), (4) Date: Feb. 21, 2001
(87) PCT Pub. No.: WO00/10836
PCT Pub. Date: Mar. 2, 2000

Related U.S. Application Data
(60) Provisional application No. 60/097,369, filed on Aug. 21, 1998.

(51) Int. Cl.⁷ ................................................ B60R 7/00
(52) U.S. Cl. .................... 224/275; 224/545; 224/547; 224/548; 224/555; 224/556; 224/563; 224/567
(58) Field of Search ...................... 224/275, 543, 224/544, 547, 548, 549, 555, 556, 557, 563, 567, 572, 545; 24/3.6, 599.5, 580, 666, 701

(56) References Cited

U.S. PATENT DOCUMENTS

| | | | |
|---|---|---|---|
| 2,023,173 A | 12/1935 | Hiener | |
| 2,163,759 A | 6/1939 | McCann | |
| 2,627,637 A | * 2/1953 | Downing | 410/106 |
| 3,037,596 A | * 6/1962 | Fordyce | 24/297 |
| 3,061,331 A | * 10/1962 | Lantis | 16/404 |
| 3,295,887 A | 1/1967 | Bacon | |
| 4,419,794 A | * 12/1983 | Horton et al. | 224/197 |
| 4,813,751 A | 3/1989 | Fenn | |
| 4,900,204 A | 2/1990 | Summers | |
| 4,964,771 A | 10/1990 | Callihan | |
| 5,040,934 A | 8/1991 | Ross | |
| 5,058,786 A | 10/1991 | Politi | |
| 5,121,958 A | 6/1992 | Goeden et al. | |
| 5,186,587 A | * 2/1993 | Moore | 24/701 |
| 5,188,421 A | 2/1993 | Arseneault | |
| 5,340,004 A | 8/1994 | Moore | |
| 5,458,447 A | 10/1995 | Clason | |
| 5,542,591 A | * 8/1996 | Moore et al. | 160/388 |
| 5,685,470 A | * 11/1997 | Moore | 224/567 |
| 5,758,392 A | 6/1998 | Anscher et al. | |
| 5,772,370 A | 6/1998 | Moore | |
| 5,772,371 A | 6/1998 | Ackerman | |
| 5,820,210 A | 10/1998 | Shipman et al. | |
| 6,030,160 A | * 2/2000 | Moore | 180/271 |

FOREIGN PATENT DOCUMENTS

| | | |
|---|---|---|
| EP | 0507161 | 3/1992 |
| EP | 0586842 | 7/1993 |
| JP | 297377 | 4/1997 |

* cited by examiner

Primary Examiner—Stephen K. Cronin
Assistant Examiner—Maerena W. Brevard
(74) Attorney, Agent, or Firm—Clark Hill PLC

(57) ABSTRACT

A cargo net assembly which may be installed and removed from between a pair of seats within an automotive vehicle. The net assembly includes a substantially rectangular interwoven mesh net. A retainer is mounted to each corner of the net for supporting the net within the vehicle. A mounting frame is secured to an interior of the vehicle and includes an aperture with an insertion section and a restraint section for receiving the retainer. The net assembly is characterized by a pair of locking tabs disposed on the mounting frame for retaining the retainer in the restraint section. The retainer also includes a clamping portion for anchoring the retainer to the corners of the net and fastening portion extending from the clamping portion for mounting the retainer to the vehicle. The clamping portion includes two interconnected sections with the corner of the net sandwiched between the sections. The net assembly is further characterized by the sections having an integral grasp for engaging the side of the net and fixedly securing the corner of the net between the sections.

19 Claims, 5 Drawing Sheets

CARGO NET ASSEMBLY

This application claims the benefit of Provisional application Ser. No. 60/097,369, filed Aug. 21, 1998.

FIELD OF THE INVENTION

The subject invention relates to a cargo net for an automotive vehicle.

DESCRIPTION OF THE PRIOR ART

Consumers are continually seeking more efficient, convenient and versatile ways to transport or store contents which are stowed in a motor vehicle such as a van, minivan, passenger sedan and sport utility vehicle. Conventional means of stowing items within the vehicle have been trunk space, the floor of the vehicle and the area behind the seats in a vehicle. One disadvantage of these conventional storage spaces is that the item freely moves within the interior of the vehicle. One solution contemplated by the automotive industry is a cargo net which may be of various shapes and sizes.

Cargo nets are frequently used when there is a need to restrain the movement of various articles. While cargo nets for passenger vehicles are considered useful items, they are often difficult to install and remove and are relatively expensive to manufacture. The cargo nets usually include a number of retainers for attaching the net to the interior of the vehicle. An example of such a cargo net is shown in U.S. Pat. No. 5,542,591. There are, however, a number of deficiencies associated with these prior art cargo nets. One such deficiency relates to the manufacturing complexity and costs of installing the retainers onto the net. In many instances they are integrally molded around a projecting end of the net. Another deficiency relates to the design of the retainer and how the retainer hooks onto the interior of the vehicle. Many of the prior art retainer designs are difficult to install and remove. Further, the prior art retainers, and subsequently the entire cargo net, may detach from the interior of the vehicle thereby releasing the items stowed within the net onto the floor of the vehicle.

Accordingly, there is a need for a cargo net assembly which is simple in design, inexpensive to manufacture and remains fixedly secured within the interior of the vehicle.

SUMMARY OF THE INVENTION

The disadvantages of the prior art may be overcome by providing a cargo net assembly adapted for installation and removal within an automotive vehicle. The net assembly comprises a net having a first side and a second side. At least one retainer is disposed on each side for supporting the net within the vehicle. A mounting frame is adapted to be secured to an interior of the vehicle. An aperture is included within the mounting frame and has an insertion section and a restraint section for receiving the retainer. The net assembly is characterized by at least one locking tab disposed on the mounting frame for retaining the retainer in the restraint section. The retainer also includes a clamping portion for fixedly anchoring the retainer to the side of the net, and a fastening portion extending from the clamping portion for mounting the retainer to the vehicle. The clamping portion includes first and second sections with the side of the net sandwiched between the first and second sections. The net assembly is further characterized by at least one of the first and second sections having an integral grasp for engaging the side of the net and fixedly securing the side of the net between the first and second sections.

The subject invention therefore incorporates relatively simple retainers which are inexpensive to manufacture. The retainers efficiently lock onto the net and are restrained to the interior of the vehicle by the locking tabs.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
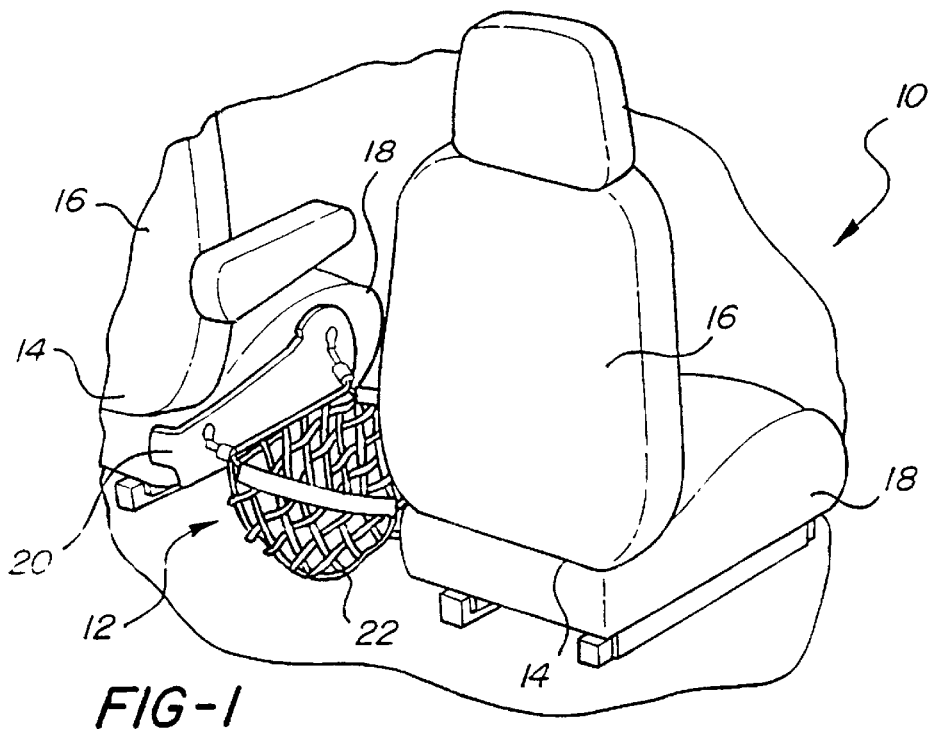
FIG. 1 is a perspective view of a cargo net installed between a pair of bucket seats within a vehicle.

Referring to the Figures, wherein like numerals indicate like or corresponding parts throughout the several views, an interior of an automotive vehicle is generally shown at 10 incorporating a cargo net assembly 12 in accordance with the subject invention. As will be discussed in greater detail below, the cargo net assembly 12 is adapted for installation and removal within the automotive vehicle. The cargo net assembly 10 is preferably shown positioned between a pair of bucket type seats 14 mounted side by side within the interior compartment 10 of the vehicle. This type of seating arrangement is found in full size vans, mini-vans, campers, sport utility vehicles and the like. As appreciated, the subject invention may be utilized in any number of locations within any suitable type of vehicle. The seats 14 include a pivotal seat back 16 mounted to a seat bottom 18 as is known in the art. The seat bottom 18 includes a seat frame 20 which is shown in the Figures as a pair of rigid side supports 20.

The cargo net assembly 12 comprises a net 22 having a first side and a second side. The net 22 is preferably an interwoven mesh net 22 also having a front side and a back side. Even more preferably, the net 22 has a substantially rectangular configuration and is made of a semi-elastic material. An elastic cord 24 extends around the perimeter of the net 22 and is interwoven or otherwise attached to the net 22. The net 22, along with the cord 24, is therefore capable of stretching and expanding as desired by a user. As appreciated, the net 22 may be formed of any suitable material and may be of any suitable design or configuration.

Figure 2:
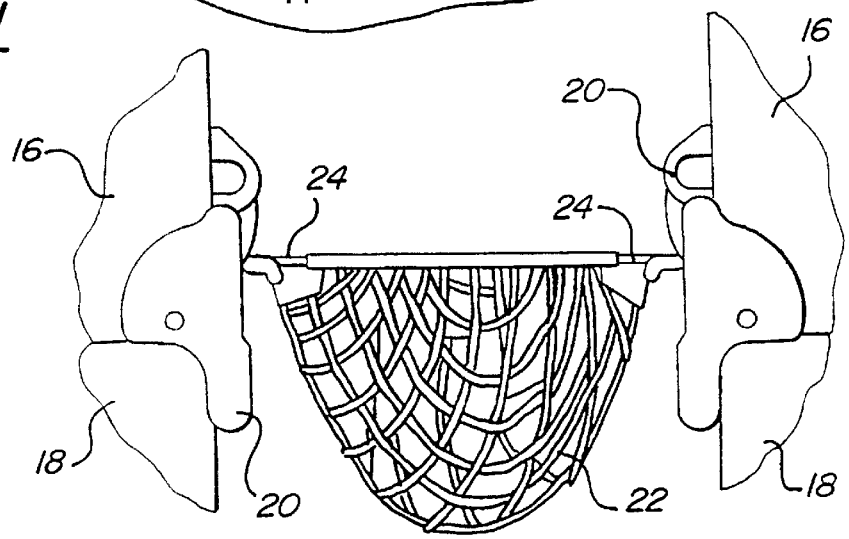
FIG. 2 is a rear view of the cargo net installed between the seats.
Figure 3:
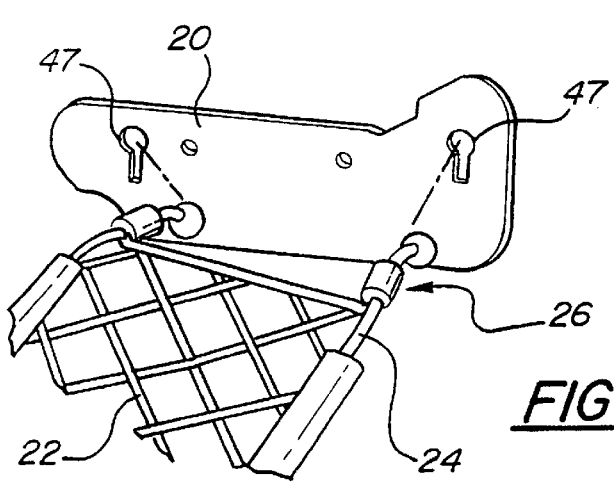
FIG. 3 is a partially broken perspective view of the cargo net being installed onto one of the seats.
Figure 4:
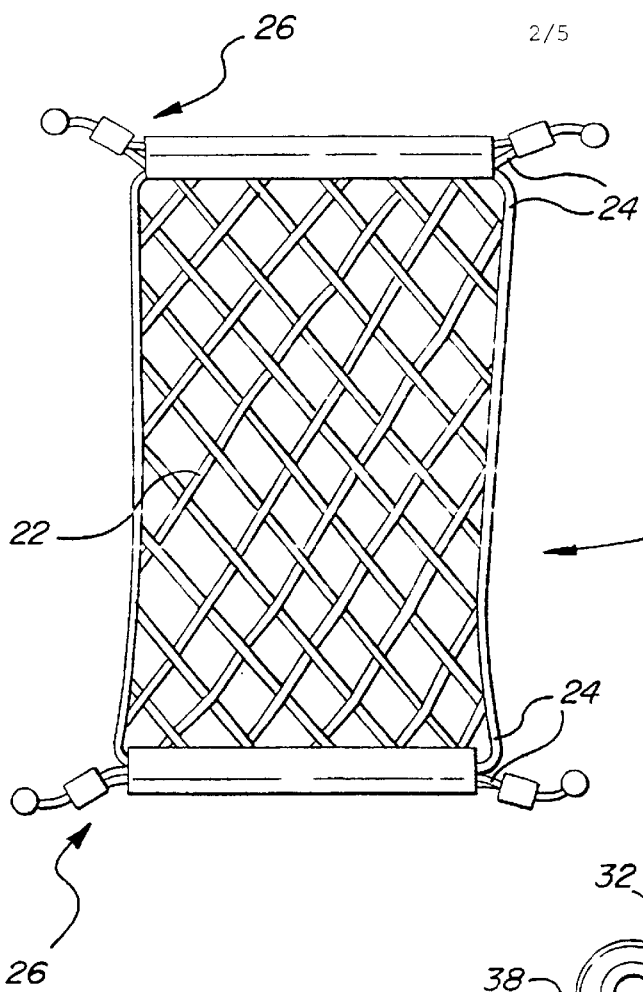
FIG. 4 is a planar view of the cargo net itself.

Preferably, the mesh net 22 is releasably mounted to the side supports 20. As best shown in FIGS. 1 and 2, the cord 24 is stretched taught between the side supports 20 of the opposing seats 14 and the net 22 is allowed to hang downward below the side supports 20. As appreciated, the net 22 may be mounted between one of the seats 14 and an adjacent interior wall, between two opposing interior walls or between any other components within the vehicle.

At least one retainer, generally shown at 26, is mounted on each side of the net 22 for supporting the net 22 within the vehicle. Preferably, there are a pair of retainers 26 mounted to each side of the net 22. In other words, there are four separate retainers 26, one mounted to each corner of the rectangular net 22.

Figure 10:
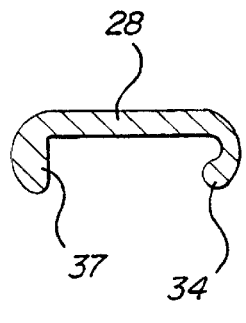
FIG. 10 is a cross-sectional view taken along line 10—10 of FIG. 9.

Referring to FIGS. 5 through 12, one of the retainers 26 of the preferred embodiment is shown in greater detail. As appreciated, each retainer 26 is substantially identical, hence only one retainer 26 is illustrated in these Figures and discussed in greater detail. Each retainer 26 includes a clamping portion for fixedly anchoring the retainer 26 to the side of the net 22. The clamping portion comprises first 28 and second 30 sections with the side of the net 22 sandwiched therebetween. The sections 28, 30 are pivotally interconnected relative to each other. Specifically, the first section 28 pivots upward relative to the second section 30 about a living hinge (not numbered). Locking flanges 34 and 34' are disposed on the first 28 and second 30 sections, respectively for interlocking the first 28 and second 30 sections together. Preferably, the locking flanges 34 and 34' extend around a majority of the sections 28, 30. A portion of the second section 30 has an open area 35 for assisting in guiding the first section 28 into position about the second section 30. The first section 28 has a generally C-shaped configuration which define the locking flanges 34. As best shown in FIG. 10, a portion of the first section 28 has a flat abutment surface 37 which corresponds to the open area 35 on the second section 30. Alternatively, the clamping portion 28, 30 could separate into two distinct parts.

Figure 12:
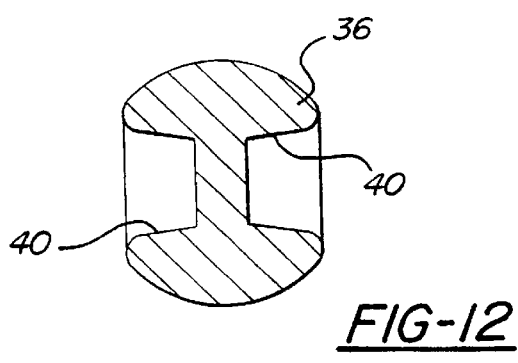
FIG. 12 is a cross-sectional view taken along line 12—12 of FIG. 9.
Figure 11:
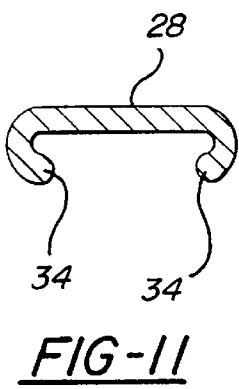
FIG. 11 is a cross-sectional view taken along line 11—11 of FIG. 9.
Figure 13:
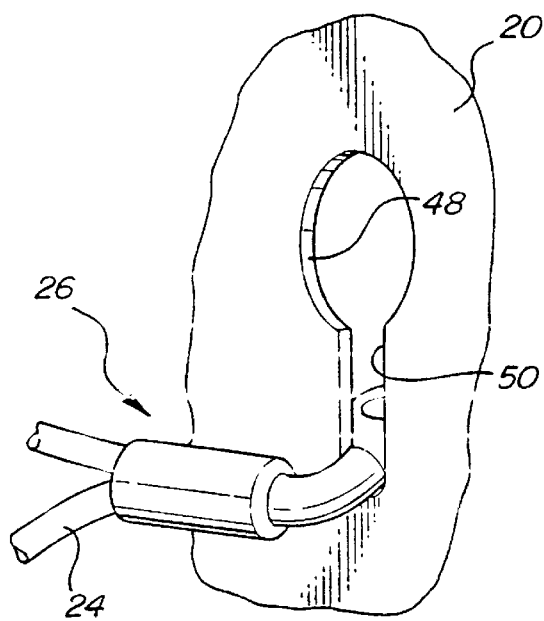
FIG. 13 is an exterior perspective view of the retainer mounted within an aperture in the seat.
Figure 14:
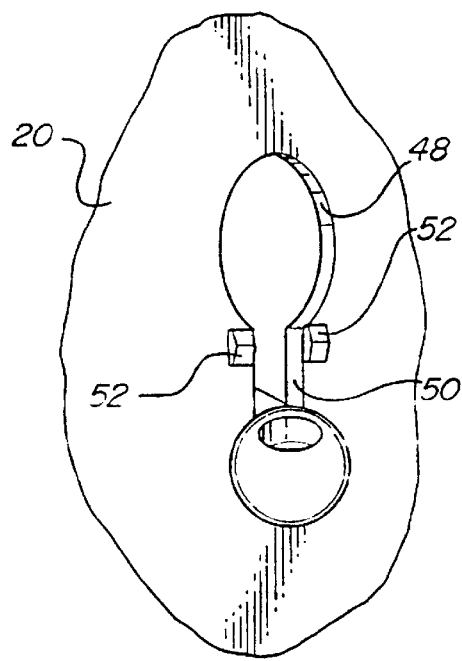
FIG. 14 is an interior perspective view of the retainer mounted within the aperture.
Figure 15:
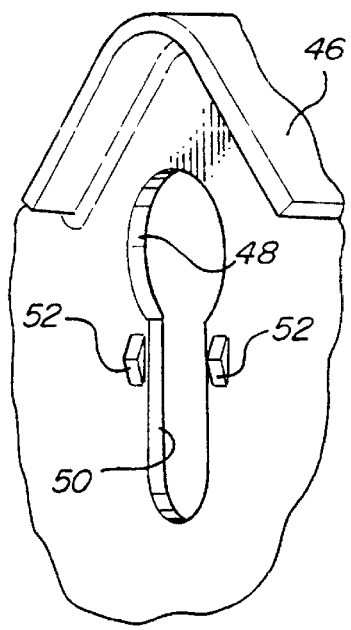
FIG. 15 is a perspective view of a mounting frame incorporating the aperture.
Figure 16:
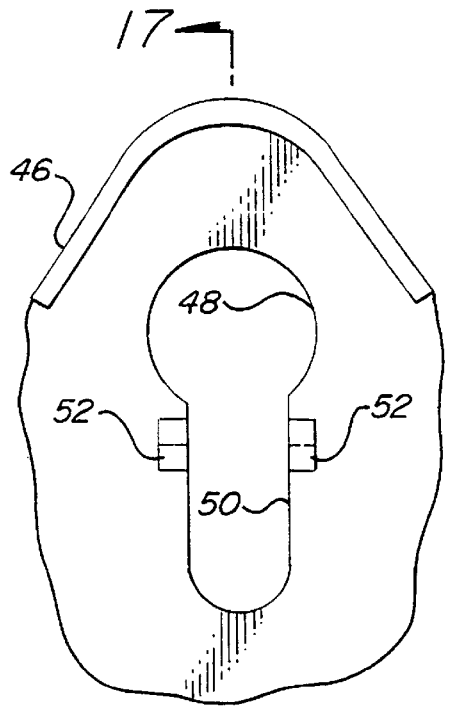
FIG. 16 is a front view of the mounting frame.
Figure 17:
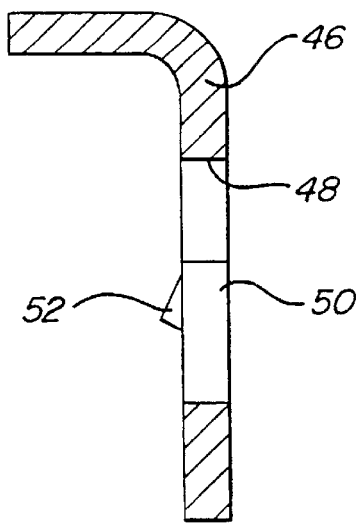
FIG. 17 is a cross-sectional view taken along line 17—17 of FIG. 16.

Each retainer 26 also includes a fastening portion 32 extending from the clamping portion 28, 30 for mounting the retainer 26 to the vehicle. The fastening portion 32 includes a shank 36 having an enlarged head 38. The shank 36 is curved substantially 90° relative to the clamping portions 28, 30. The enlarged head 38 is preferably ball shaped. As best shown in FIG. 12, recesses 40 are integrally formed diametrically on opposite sides of the head 38. The recesses 40 assist in reducing any sink marks from the head 38 of the retainer 26. In other words, the recesses 40 reduce the probability that an imperfection will form in the head 38 during molding which ensures an aesthetically pleasing and higher quality part.

Figure 5:
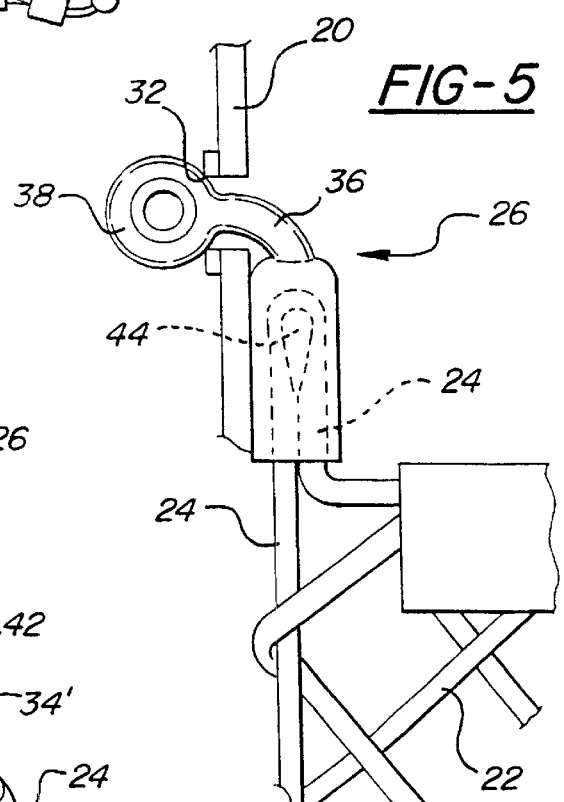
FIG. 5 is an enlarged partially broken top view of a retainer of the cargo net installed onto the seat.
Figure 6:
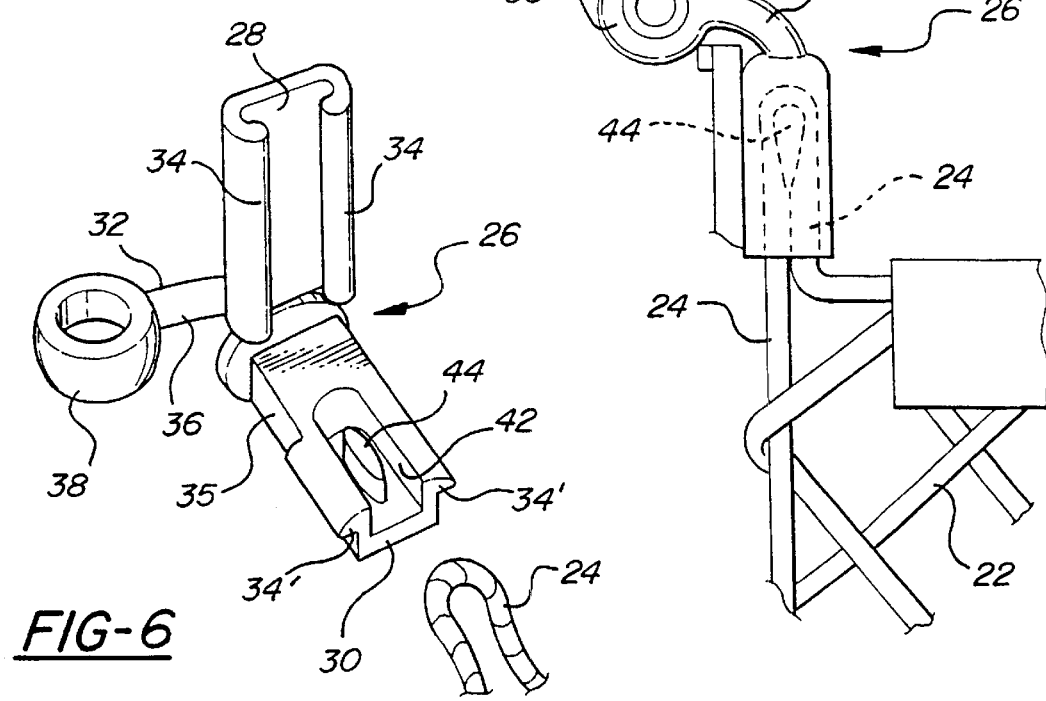
FIG. 6 is a perspective view of the retainer in an opened position.
Figure 7:
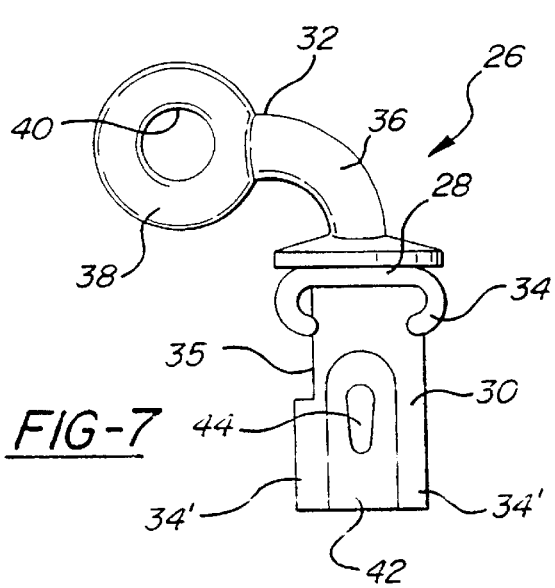
FIG. 7 is a top view of the retainer.
Figure 8:
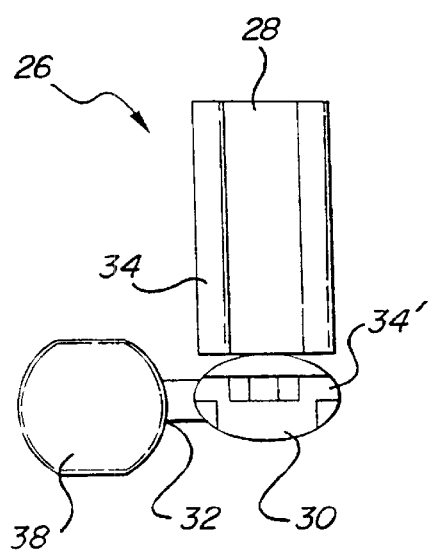
FIG. 8 is an end view of the retainer.
Figure 9:
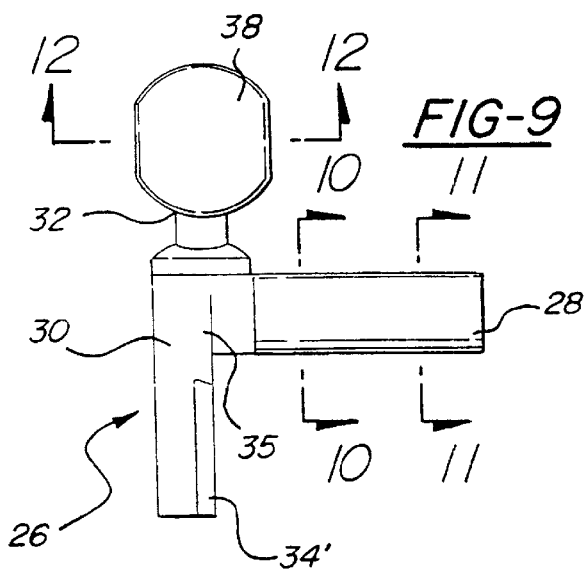
FIG. 9 is a side view of the retainer.

At least one of the first 28 and second 30 sections has an integral grasp 42 for engaging the side of the net 22 and fixedly securing the side of the net 22 between the first 28 and second 30 sections. As best shown in FIGS. 6 through 8, the grasp 42 is further defined as an integral groove formed within one of the first 28 and second 30 sections. An inner stud 44 extends from one of the first 28 and second 30 sections into the groove for creating a channeled configuration. The stud 44 preferably extends from the second section 30. The cord 24 is preferably sandwiched between the first 28 and second 30 sections as best shown in FIGS. 5 and 6. In other words, the cord 24 seats within the grasp 42. Hence, the grasp 42 should have a configuration which compliments the configuration of the cord 24, i.e., cylindrical. As appreciated, the grasp 42 may be of any suitable design and may include a number of inwardly projecting barbs (not shown) to act as a retaining device for the cord 24.

To mount the retainer 26 to the net 22, the cord 24 is placed within the grasp 42 and around the inner stud 44. The first section 28 is then pivoted downward toward the second section 30. The flanges 34 of the first section 28 lockingly engage the flanges 34' of the second section 30 to sandwich the cord 24 between the sections 28, 30 and fixedly secure the cord 24 within the grasp 42. As discussed above, the flat abutment surface 37 of the first section 28 aligns with the open area 35 of the second section 30 to guide the two sections 28, 30 together.

Referring also to FIGS. 13 through 18, a mounting frame 46 is adapted to be secured to the interior of the vehicle. In the preferred embodiment, the mounting frame 46 is an integral part of the side support 20 of the seats 14. As appreciated, the mounting frame 46 may be a separate part, a portion of the interior walls, other portions of the seat 14 or the like. A proposed design of a separate mounting frame 46 is shown in FIGS. 15 through 18. Key-holed shaped apertures 47 are disposed within the mounting frame 46 and each includes an insertion section 48 and a retaining section 50 for receiving the retainer 26. At least one locking tab 52 is disposed on the mounting frame 46 for retaining the retainer 26 in the retaining section 50. Preferably, a locking tab 52 is 52 disposed on each side of the retaining section 50. Preferably, the locking tabs 52 are disposed on an interior surface of the side support 20 to provide an aesthetically pleasing exterior surface. As appreciated, there may be any number of locking tabs 52 disposed along any suitable position on the mounting frame 46 or other such frame so long as the retainers 26 can be adequately secured to the seats 14.

The shank 36 and enlarged head 38 of the retainer 26 are installed within the mounting frame 46. Specifically, the head 38 is inserted through the insertion section 48, slid into the retaining section 50 and detented over the locking tabs 52 to secure the retainer 26 to the mounting frame 46. The preferred embodiment includes the insertion section 48 having a substantially annular configuration sized to accommodate the head 38 the retainer 26. The retaining section 50 has a substantially U-shaped configuration extending from the annular insertion section 48 for defining a substantially key shaped aperture 47.

Figure 18:
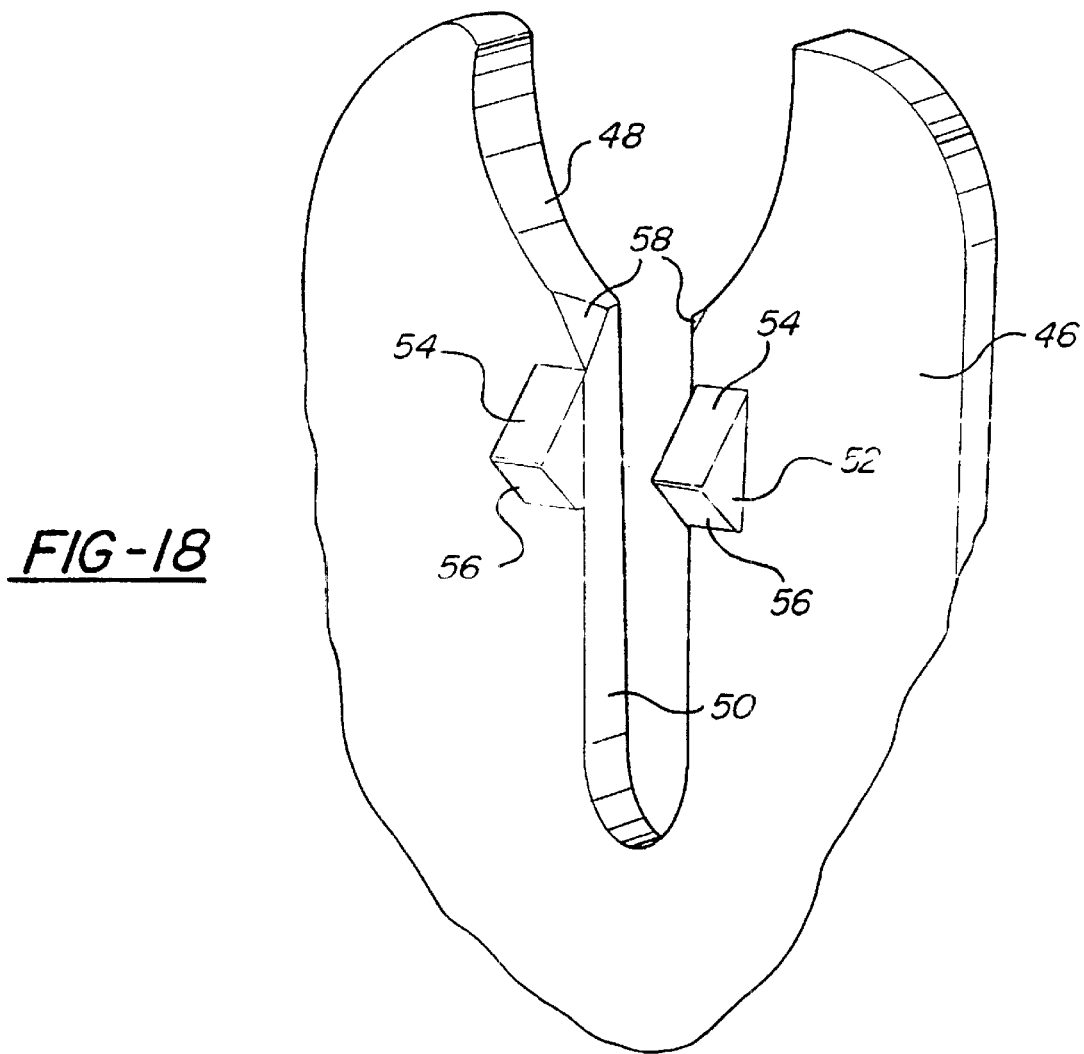
FIG. 18 is an enlarged partially broken perspective view of the mounting frame.

As illustrated best in FIG. 18, the preferred embodiment of the locking tab 52 includes a front sloping surface 54 and a rear sloping surface 56 defining a substantially triangular configuration. The rear sloping surface 56 preferably has a steeper slope in comparison to the front sloping surface 54.

A ramped surface 58 is disposed above each of the locking tabs 52 and interconnects the insertion 48 and retaining 50 sections for creating a smooth transition between the insertion 48 and retaining 50 sections such that the head 38 of the retainer 26 efficiently slides from the insertion section 48, over the locking tabs 52 and into the restraint section 50.

During installation of the mesh net 22, a user places the enlarged head 38 through the insertion section 48 of the aperture 47 and then pushes the retainer 26 downward toward the retaining section 50. The head 38 passes over the ramped surfaces 58 and the front sloping surface 54 of the locking tabs 52. The curved shank 36 must be of sufficient length in order for the head 38 to pass over the locking tabs 52. The head 38 then slides down the rear sloping surface 56 of the tabs 52 which allows the shank 36 of the retainer 26 to abut the bottom of the restraint section 50. The head 38 correspondingly abuts the tabs 52. The retainer 26 is now secured within the aperture 48, 50 of the mounting frame 46 which in turn secures the mesh net 22 to the side support 20. To remove the mesh net 22, the user pushes inward and upward on the retainer 26 such that the head 38 adequately clears the tabs 52 and can be removed through the larger insertion section 48 in the aperture 47.

The mesh net 22 is preferably installed in the vehicle in an outstretched condition whereby the mesh net 22 extends between two adjacent mounting frames. For example, extending between two adjacent vehicle seats. If, on the other hand, the user wishes to open the space between the seats, the user removes the retainers 26 on one side of the mesh net 22 and inserts the retainers 26 in the apertures 47 on the opposite mounting frame 46. The retaining section portion 50 has a length which accommodates more than one retainer 26. The mesh net 22 will now hang from a single mounting frame 46, e.g., from one seat, in a stored condition.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims, the invention may be practiced otherwise than as specifically described.

What is claimed is:

1. A cargo net assembly (12) adapted for installation and removal within an automotive vehicle, said net assembly (12) comprising;
    a net (22) having a first side and a second side and including at least one retainer (26) on each side for supporting said net (22) within the vehicle,
    a pair of spaced apart mounting frames (46) adapted to be secured to an interior of the vehicle and including an aperture (47) for receiving said retainer (26),
    at least one of said apertures (47) sized to receive and retain a plurality of retainers (26) whereby said net (22) is capable of being installed to both mounting frames (46) in an outstretched condition and capable of being installed to one of said mounting frames (46) supported by said at least one of said apertures (47) for mounting said net (22) in a stored condition,
    wherein said apertures (47) are key-hole shaped having an insertion section (48) and a retaining section (50) and said retainer (26) further includes a shank (36) having an enlarged head (38) such that said head (38) may be inserted through said insertion section (48), and slid into said retaining section (50),
    said mounting frame (46) has a tab (52) disposed on each side of said aperture (47), each of said tabs (52) presenting a detent surface to frictionally retain said retainer (26) in said aperture (47), and
    wherein each of said tabs (52) further includes a ramped surface (58) interconnecting said insertion (48) and retaining (50) sections for creating a smooth transition between said insertion (48) and retaining (50) sections such that said head (38) of said retainer (26) efficiently slides from said insertion section (48), over said locking tabs (52) and into said retaining section (50).

2. An assembly as set forth in claim 1 wherein said net (22) has a pair of retainers (26) mounted to each side of said net (22).

3. An assembly as set forth in claim 1 wherein said retainer (26) further includes a clamping portion for fixedly anchoring said retainer (26) to said side of said net (22).

4. An assembly as set forth in claim 3 wherein said clamping portion includes first (28) and second (30) sections with said side of said net (22) sandwiched between said first (28) and second (30) sections.

5. An assembly as set forth in claim 4 wherein at least one of said first (28) and second (30) sections includes an integral grasp (42) for engaging said side of said net (22) and fixedly securing said side of said net (22) between said first (28) and second (30) sections.

6. An assembly as set forth in claim 5 wherein said grasp (42) is further defined as a groove disposed within one of said first (28) and second (30) sections.

7. An assembly as set forth in claim 6 further including locking flanges (34, 34') disposed on said first (28) and second (30) sections for interlocking said first (28) and second (30) sections together.

8. A cargo net assembly (12) for an automotive vehicle comprising;
    a net (22) having a first side and a second side,
    at least one retainer (26) mounted to each side of said net (22) for supporting said net (22) within the vehicle in an outstretched and a stored condition,
    said retainer (26) including a clamping portion for fixedly anchoring said retainer (26) to said side of said net (22), and a fastening portion (32) extending from said clamping portion for mounting said retainer (26) to the vehicle,
    said clamping portion having first (28) and second (30) sections with said side of said net (22) sandwiched between said first (28) and second (30) sections,
    said net assembly (12) characterized by at least one of said first (28) and second (30) sections having an integral grasp (42) for engaging said side of said net (22) and fixedly securing said side of said net (22) between said first (28) and second (30) sections,
    wherein said grasp (42) is further defined as an integral groove having a substantially tear drop shaped configuration formed within one of said first (28) and second (30) sections
    an inner stud (44) extending from one of said first (28) and second (30) sections into said groove for creating a channeled configuration such that said net (22) rests within said channeled groove, and
    locking flanges (34, 34') disposed on said first (28) and second (30) sections for interlocking said first (28) and second (30) sections together.

9. An assembly as set forth in claim 8 wherein said net (22) is an interwoven mesh net (22) having an elastic cord (24) disposed within each side thereof.

10. An assembly as set forth in claim 9 wherein said net (22) has a pair of retainers (26) mounted to each side of said net (22).

11. An assembly as set forth in claim 10 further including a pair of mounting frames (46) adapted to be secured to an interior of the vehicle and including a key-hole shaped aperture (47) having an insertion section (48) and a retaining section (50) for receiving said retainer (26).

12. An assembly as set forth in claim 11 where each of said apertures (47) has at least one tab (52) disposed on each side of said aperture (47) between said insertion (48) and retaining (50) sections.

13. A cargo net assembly (12) adapted for installation and removal within an automotive vehicle, said net assembly (12) comprising;

a net (22) having a first side and a second side and including at least one retainer (26) on each side for supporting said net (22) within the vehicle, a pair of spaced apart mounting frames (46) adapted to be secured to an interior of the vehicle and including an aperture (47) for receiving said retainer (26), said apertures (47) are key-hole shaped having an insertion section (48) and a retaining section (50) and said retainer (26) further includes a shank (36) having an enlarged head (38) such that said head (38) may be inserted through said insertion section (48), and slid into said retaining section (50), said net assembly (12) characterized by said mounting frames (46) each has a tab (52) disposed on each side of said aperture (47), each of said tabs (52) presenting a detent surface to frictionally retain said retainers (26) in said apertures (47), and wherein each of said tabs (52) further includes a ramped surface (58) interconnecting said insertion (48) and retaining (50) sections for creating a smooth transition between said insertion (48) and retaining (50) sections such that said head (38) of said retainer (26) efficiently slides from said insertion section (48), over said locking tabs (52) and into said retaining section (50).

14. An assembly as set forth in claim 13 wherein said net (22) has a pair of retainers (26) mounted to each side of said net (22).

15. An assembly as set forth in claim 13 wherein said retainer (26) further includes a clamping portion for fixedly anchoring said retainer (26) to said side of said net (22).

16. An assembly as set forth in claim 15 wherein said clamping portion includes first (28) and second (30) sections with said side of said net (22) sandwiched between said first (28) and second (30) sections.

17. An assembly as set forth in claim 16 wherein at least one of said first (28) and second (30) sections includes an integral grasp (42) for engaging said side of said net (22) and fixedly securing said side of said net (22) between said first (28) and second (30) sections.

18. An assembly as set forth in claim 17 wherein said grasp (42) is further defined as a groove disposed within one of said first (28) and second (30) sections.

19. An assembly as set forth in claim 18 further including locking flanges (34, 34') disposed on said first (28) and second (30) sections for interlocking said first (28) and second (30) sections together.

* * * * *